United States Patent [19]

Henn et al.

[11] Patent Number: 4,843,955
[45] Date of Patent: Jul. 4, 1989

[54] MACHINE FOR BREWING COFFEE AND OTHER HOT BEVERAGES

[75] Inventors: Stefan Henn; Klaus Beumer, both of Solingen, Fed. Rep. of Germany

[73] Assignee: Robert Krups Stiftung & Co. K.G., Solingen, Fed. Rep. of Germany

[21] Appl. No.: 184,682

[22] Filed: Apr. 22, 1988

[30] Foreign Application Priority Data

Apr. 24, 1987 [DE] Fed. Rep. of Germany ... 8705978[U]

[51] Int. Cl.⁴ ............................................. A47J 31/24
[52] U.S. Cl. ........................................ 99/295; 99/299
[58] Field of Search .................................. 99/279–283, 99/295, 299, 300, 301, 304, 305, 306, 307; 426/433

[56] References Cited

U.S. PATENT DOCUMENTS 3,187,663  6/1965  Mc Lean ............................. 99/299
3,356,010 12/1967  Eisendrath ........................... 99/299
3,450,024  6/1969  Martin ................................. 99/295
4,667,587  5/1987  Wunder ............................... 99/279

Primary Examiner—Robert W. Jenkins
Attorney, Agent, or Firm—Peter K. Kontler

[57] ABSTRACT

A machine for brewing coffee or other hot beverages has a container for a supply of liquid, a heater, a hollow filter holder which can receive a relatively large quantity of comminuted coffee beans or another flavoring agent, and a riser which conveys heated liquid to the filter holder. The admitted liquid contacts the confined supply of flavoring agent and can be discharged by way of a sealable opening in the bottom wall of the filter holder. If the machine is to brew a single cupful or a similar relatively small quantity of a hot beverage, the holder receives an insert which can hold a small quantity of flavoring agent and is contacted by hot liquid before the liquid enters the interior of the holder where it can be stored or discharged into a cup or another relatively small vessel. The insert has a bottom wall provided with a recess for one or more small bags of flavoring agent, and the bottom wall of the insert has one or more siphons or other types of outlets for evacuation of a freshly brewed hot beverage from the recess.

28 Claims, 3 Drawing Sheets

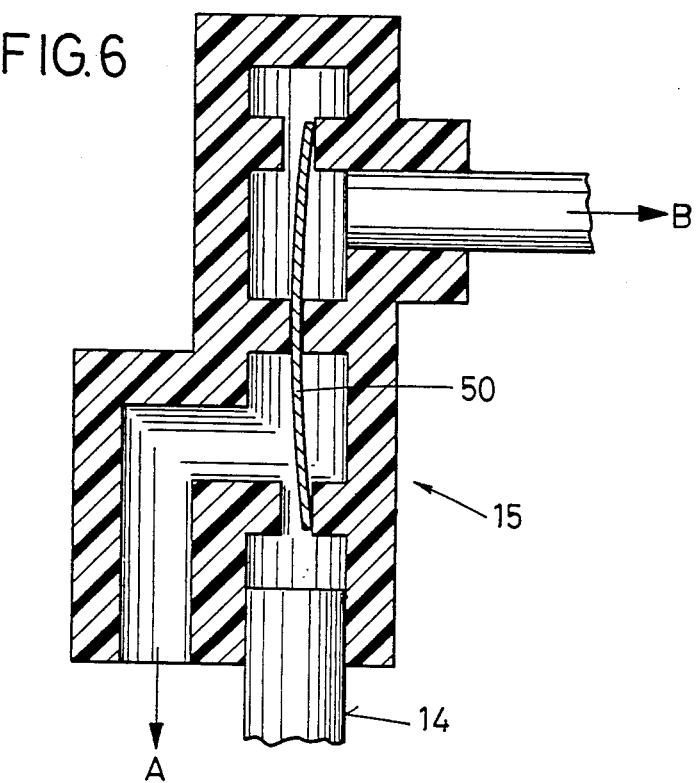

MACHINE FOR BREWING COFFEE AND OTHER HOT BEVERAGES

CROSS-REFERENCE TO RELATED CASE

Certain parts of the machine of the present invention are identical with the corresponding parts of the machine which is disclosed in the commonly owned copending patent application Ser. No. 184,683 filed Apr. 22, 1988 by Stefan HENN and Rudolf MAASS for "Machine for brewing hot beverages", now U.S. Pat. No. 4,790,240, granted Dec. 13, 1988.

BACKGROUND OF THE INVENTION

The invention relates to machines for brewing coffee, tea, hot chocolate and/or other hot beverages. More particularly, the invention relates to improvements in machines of the type wherein a housing supports or confines a container for a supply of liquid (such as water or milk), a preferably electric heater which can raise the temperature of liquid, a filter holder which can receive a relatively large supply of comminuted coffee beans, comminuted tea leaves or another flavoring agent, and a riser or other suitable means for conveying heated liquid from the heater to the filter holder so that the heated liquid contacts the flavoring agent and the resulting hot beverage can issue from the holder by way of a suitable opening when such opening is not sealed by a gate. The housing is normally provided with a base or support (e.g., an electrically heatable warming plate) for a vessel (such as a coffee pot, a carafe or a cup) which receives hot beverage from the interior of the filter holder when the opening is exposed.

Machines of the above outlined character come in all sizes and shapes. For example, a relatively large coffee or tea brewing machine will be designed to brew eight, ten or twelve cupfuls of coffee or tea, and a relatively small machine will be designed to brew two cupfuls. This depends on the capacity of the liquid container and on the capacity of the filter holder, i.e., on the quantity of comminuted coffee beans or tea leaves or another flavoring agent which can be admitted into the filter holder to be contacted by heated liquid. Conventional machines operate quite satisfactorily as long as they are set up to furnish at least two cupfuls of a hot beverage; however, the quality (especially the temperature) of the hot beverage is much less satisfactory or totally unsatisfactory if a conventional machine is used to brew a single cupful of coffee, tea or another hot beverage. Thus, the beverage which is made in such small quantities is tepid when it issues from the machine so that it cannot be enjoyed by a person who is accustomed to a piping hot or to an at least reasonably hot beverage.

OBJECTS AND SUMMARY OF THE INVENTION

An object of the invention is to provide a novel and improved machine for brewing coffee, tea or another hot beverages which is constructed and assembled in such a way that it can produce small or extremely small quantities of hot beverages without adversely affecting their quality, such as the temperature, color and/or aroma.

Another object of the invention is to convert an existing coffee making, tea making or like machine for the making of relatively small quantities of hot beverages in a simple and inexpensive way.

A further object of the invention is to provide novel and improved inserts for use in the filter holders of coffee making and like machines.

An additional object of the invention is to provide a machine which can brew a single cupful, two cupfuls or much larger quantities of hot beverages without any, or without appreciable, changes in the quality of the beverages.

Still another object of the invention is to provide a novel and improved combination of a filter holder and insert for use in a coffee making or like machine.

A further object of the invention is to provide a novel and improved method of converting a relatively large coffee making or like machine for the brewing of hot beverages into a machine which can selectively furnish large or small quantities of hot beverages.

Another object of the invention is to provide a machine which can operate with commercially available metered quantities of comminuted coffee beans, comminuted tea leaves o other flavoring agents for the making of hot beverages.

An additional object of the invention is to provide a coffee maker or a like brewing machine with a set of accessories which enable the user to make high-quality hot beverages in larger or smaller quantities.

One feature of the invention resides in the provision of a machine for brewing hot beverages, such as coffee, tea, chocolate and others. The machine comprises a preferably hollow housing or frame, a container for a predetermined quantity of liquid, such as milk or water (the container can form part of or can be removably or permanently installed in the housing), and a hollow filter holder which is carried by the housing and has an opening. The filter holder serves to receive a relatively large quantity of a flavoring agent (e.g., comminuted coffee beans) to be contacted by heated liquid, and the aforementioned opening is preferably provided in a bottom wall of the holder which latter can resemble a hollow conical frustum. The machine further comprises a gate which is carried by the housing (such gate can be installed directly on the holder) and is movable between open and closed positions in which the opening is respectively exposed and sealed, an insert which is removably receivable in the filter holder and serves to receive a relatively small quantity of flavoring agent, and a conduit and/or other suitable means for conveying heated liquid from the heater to the holder so that the heated liquid contacts the relatively large quantity of flavoring agent in the filter holder when the insert is removed and the relatively small quantity of flavoring agent when the insert is properly installed in the holder. The opening of the filter holder is provided at a level below the relatively large or relatively small quantity of flavoring agent in the holder so that the heated liquid which has contacted the flavoring agent in the holder descends by gravity toward and gathers above the opening when the gate is held in closed position. The machine can further comprise a support (such as an electrically heatable warming plate) for vessels beneath the opening of the filter holder so that a vessel resting on the support can receive liquid from the holder in the open position of the gate.

In accordance with a presently preferred embodiment of the improved machine, the insert has a bottom wall which is provided with at least one recess for reception of the relatively small quantity of flavoring agent. The bottom wall has at least one outlet for the flow of heated liquid from the recess into the interior of the filter holder above the opening. The insert can include at least one siphon which defines the at least one outlet. For example, the recess can have spaced-apart first and second extensions and a main portion between such extensions. The main portion receives one or more bags or other types of receptacles for a relatively small quantity of flavoring agent, and the bottom wall of the insert then comprises first and second outlets which respectively communicate with the first and second extensions of the recess. Each outlet can include a pipe having a portion which extends upwardly into the respective extension of the recess and has a hole for the passage of liquid from the recess into the interior of the filter holder above the opening when the liquid level in the recess and its extensions rises to the upper ends of the respective holes. The insert can be further provided with hoods which overlie the aforementioned portions of the pipes in the insert and are spaced apart from the upwardly extending portions of the respective pipes to define with such portions clearances for the flow of liquid from the recess into the interior of the filter holder above the opening when the supply of liquid in the recess rises so that the upwardly extending portions of the pipes are immersed in the liquid. Each pipe can further include a second portion which extends downwardly beyond the underside of the bottom wall of the insert to direct the liquid into a selected portion of the interior of the filter holder.

The bottom wall can be provided with one or more bases (e.g., in the form of spaced apart legs) which serve as rests for the hood or hoods and ensure that each hood invariably defines with the respective pipe a clearance for the flow of liquid from the recess.

The bottom wall can be inclined with reference to a horizontal plane when the insert is installed in the filter holder; this ensures that the entire supply of liquid which gathers in the recess can be evacuated from the recess, e.g., by providing an outlet at a location to receive liquid from the lowermost portion of the recess. If the bottom wall has several outlets and each such outlet includes a pipe, the upper ends of the pipes can be disposed at different levels so that the evacuation of liquid from the recess can take place by way of a single pipe or by a first set of pipes when such supply rises to a first level, and by way of several pipes or several sets of pipes when the supply of liquid in the insert rises to a higher second level.

The bottom wall can be provided with ribs, stubs, rings or otherwise configurated supporting means for the relatively small supply of flavoring agent in the recess.

The gate can comprise at least one stop which is engageable by a vessel so that the vessel can move the gate to open position and to thereupon receive liquid from the filter holder by way of the opening in the filter holder. The stop ca be engaged by the rim of a cup or an analogous relatively small vessel. The gate can comprise a lever having an enlarged portion which includes the aforementioned stop and can be further provided with at least one cam face along which the rim of a cup or another vessel can slide on its way toward engagement with the stop. The filter holder can be provided with a substantially cylindrical or otherwise configurated wall in the form of a skirt which is provided with a slot for a portion of the lever so that the surfaces bounding the slot determine the extent of movability of the lever relative to the filter holder. The lever can be pivotally secured to the holder for angular movement about a substantially horizontal axis, and the aforementioned portion of the lever can include an arm which can be engaged and moved by hand so as to open or close the gate.

The insert can include a rim which is integral with the bottom wall and has an external surface complementary to the internal surface of the hollow filter holder to thus ensure that the insert can be installed in the filter holder in a predetermined optimum position in which the recess can receive heated liquid from the conveying means. The internal surface of the holder can form part of or can constitute a substantially conical surface.

The insert can be provided with one or more handles which facilitate its introduction into and its removal from the filter holder.

At least one outlet in the bottom wall of the insert can include a hole, and the insert can comprise means (e.g., one or more adjustable flow restrictors or valves) for regulating the rate of liquid flow through the outlet or outlets of the bottom wall.

The recess of the insert can receive commercially available bags or otherwise configured receptacles which contain metered quantities of a flavoring agent. The relatively small quantity of flavoring agent which fits into the recess of the insert can serve for the brewing of one or two cups of coffee, tea or another hot beverage.

Another feature of the invention resides in the provision of a novel article of manufacture which can be used in the hollow filter holder of a coffee making machine or another machine for brewing hot beverages. The novel article constitutes an insert having a bottom wall provided with a recess for a supply of comminuted coffee beans or another flavoring agent which is to be contacted by a hot liquid to produce a hot beverage. The bottom wall has at least one outlet (e.g., a siphon or a hole and a reciprocable or otherwise movable valving element which can select the rate of outflow of hot beverage from the recess).

The novel features which are considered as characteristic of the invention are set forth in particular in the appended claims. The improved machine itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 6 is an enlarged schematic vertical sectional view of the manifold and of the valving element in the manifold.

DESCRIPTION OF THE PREFERRED EMBODIMENTS

Figure 1:
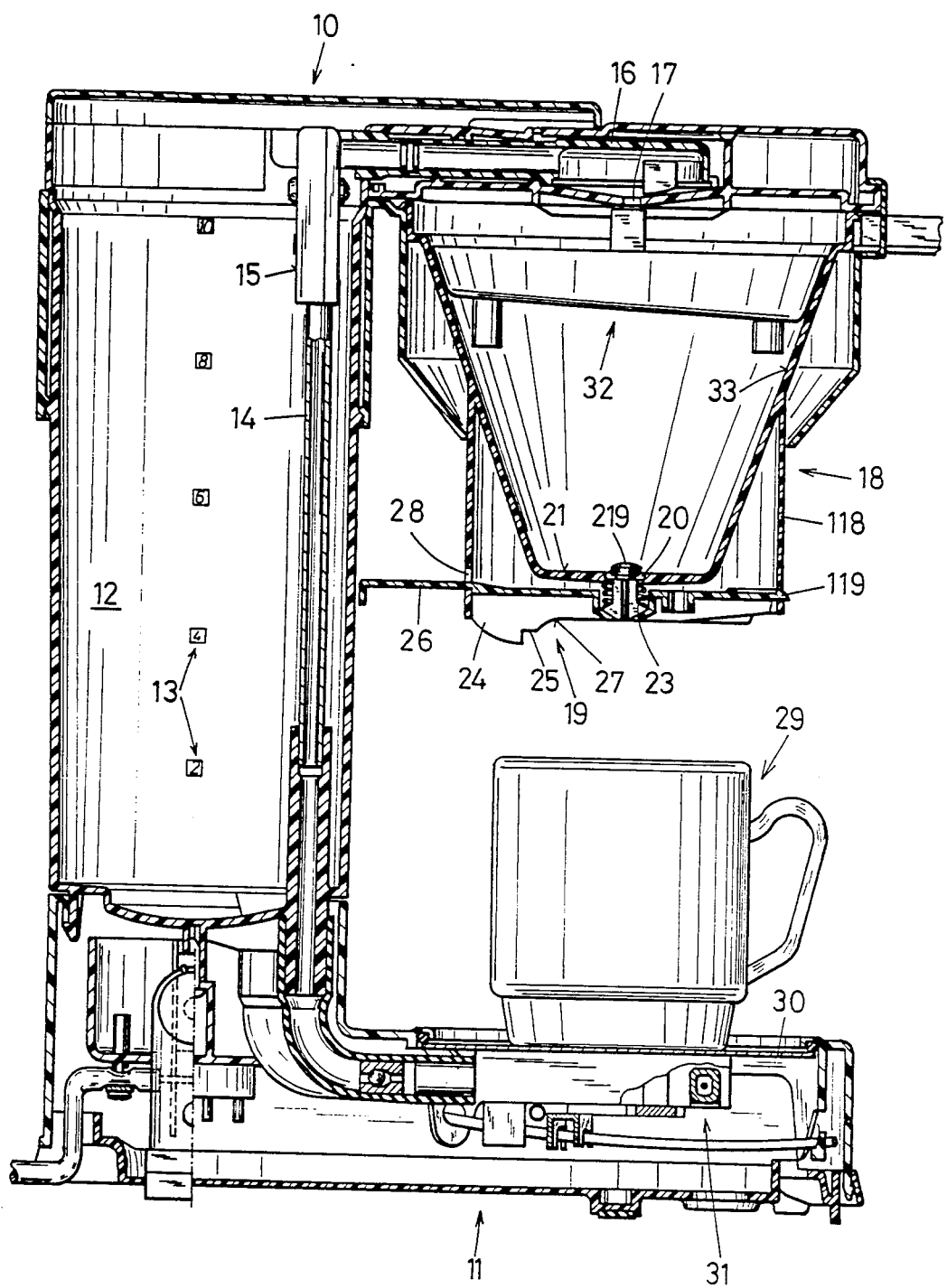
FIG. 1 is a partly elevational and partly vertical sectional view of a beverage brewing machine which embodies the invention, further showing a cup on the warming plate beneath the filter holder.

The drawing merely shows those components of the improved brewing machine 10 which are necessary for full understanding of the invention. For example, the drawing does not show the knobs, levers and other actuating elements of the machine, the electric circuit, and the means for connecting the machine with a source of electrical energy. All components which are not shown but are or could be used in the improved machine can be of the type employed in available machines, for example, in a machine known as "Euro-/Brew Signal" coffee maker No. 152 which is distributed by the assignee of the present application.

The machine 10 which is shown in FIG. 1 can be used for the brewing of coffee and comprises a substantially L-shaped hollow housing having a base 11 which carries a support in the form of a warming plate 30 at a level above an electric heater 31. The plate 30 supports a coffee cup 29 but can also support a pot, a carafe or any other suitable vessel for one or more portions of hot coffee. In addition to the heater 31, the hollow housing of the machine 10 accommodates a removable upright water container 12 at least certain portions of which are preferably made of a light-transmitting material, for example, in the region of a row of markers 13 which denote the quantities of confined liquid (normally water). As shown, the container 12 can be designed to confine a supply of fresh water which suffices to make a total of ten regular cups of coffee. The illustrated container 12 occupies the major portion of the interior of the hollow housing of the machine 10. If desired, the container 12 can form an integral part of the housing, and the latter is then provided with a removable cap which normally seals the upper end of the container but can be detached in order to permit replenishment of the supply of fresh water.

A conduit 14 in the hollow housing of the machine 10 has a first portion adjacent the heater 31, a second portion attached to the inlet of a distributor or manifold 15 in the housing, and a third portion connected to the outlet of the container 12. When a suitable valve in the conduit 14 is opened, fresh water flows from the container 12 past the heater 31, which raises the temperature of flowing water, and into the manifold 15. The conduit 14 is a riser which conveys heated water into the interior of the manifold 15 wherein the temperature of admitted hot water is monitored by a disc-shaped deformable valving element 50 (FIG. 6). If the temperature of heated water is below a given value, the valving element 50 assumes the position or shape which is shown in FIG. 6 by solid lines; at such time, the valving element 50 seals the water-discharging upper part of the conduit or riser 14 from the intake 16 of a filter holder 18 but permits water to flow back into the container 12. If the temperature of water rising in the conduit 14 reaches or exceeds the given value which is satisfactory for the brewing of one or more cups of hot coffee, the valving element 50 assumes the shape or position which is shown in FIG. 6 by phantom lines; the conduit 14 is then sealed from the container 12 but hot water is free to enter the intake 16 of the filter holder 18. The transition from one position or shape to the other position or shape of the valving element 50 is abrupt, i.e., the marginal portion of the valving element 50 simply snaps over from the one position to the other position, depending upon whether the temperature of water which is supplied by the conduit 14 is at or above the given value or has dropped below such given value.

The intake 16 of the filter holder 18 is a horizontal pipe which is installed in the upper portion of the hollow housing of the machine 10 and can deliver hot water to an opening 17 for admission into a chamber which accommodates a supply f comminuted (e.g., pulverized) coffee beans. As a rule, the filter holder 18 will receive a hollow conical filter paper which is inserted into the aforementioned chamber and contains a requisite supply of comminuted coffee beans.

FIG. 1 further shows a novel insert 32 which is removably installed in the upper portion of the filter holder 18 and the details of which are shown in FIGS. 2 to 5. The insert 32 is employed when the operator wishes to brew only a relatively small quantity, e.g., one or two cupfuls, of hot coffee.

The insert 32 can be made of a suitable non-metallic (plastic) material and resembles a relatively shallow pan with a non-horizontal bottom wall 34 and an upwardly extending rim 35 which is integral with the marginal portions of the bottom wall 34. The inclination of the outer side of the rim 35 preferably matches or approximates the inclination of the frustoconical internal surface 33 surrounding the aforementioned filter chamber in the holder 18. This renders it possible to install the insert 32 in the holder 17 in an optimum position such as is shown in FIG. 1. In order to facilitate placing of the insert 32 into and its extraction from the upper portion of the filter holder 18, the insert 32 is preferably provided with one or more handles 36 in the form of upwardly extending lugs which are integral with the bottom wall 34.

The central portion of the inner (upper) side of the bottom wall 34 of the insert 32 is provided with a square or rectangular depression or recess 37. Parallel supporting ribs 38, which are integral parts of the bottom wall 34, extend into the recess 37 to carry at least one porous bag (not shown) made of filter paper and containing a requisite supply of comminuted coffee beans, i.e., a supply which suffices for the making of the aforementioned relatively small quantity of hot coffee. The configuration of the bag (which is a commercially available product) normally matches or resembles the shape of the recess 37. It is equally within the purview of the invention to furnish the machine 10 with an insert 32 which has a differently configured (e.g., substantially circular, oval, hexagonal or other) outline, depending on the outline of the bag which is to be placed onto the supporting ribs 38. The recess 37 can be dimensioned to receive a layer consisting of two or more bags. Moreover, the ribs 38 need not be parallel and equidistant from each other; for example, the bottom wall 34 can be provided with one ring-shaped rib or with two or more concentric or nonconcentric ring-shaped ribs. Still further, the ribs 38 can extend across the full width of the recess 37, they can be shorter than those shown in FIG. 3, or some of the ribs can be longer than the other ribs.

The recess 37 has two substantially semicircular extensions 39 which are located opposite each other. The central portion of such extension 39 communicates with the hole 41 of a discrete upright pipe or outlet 40 having a lower portion 42 extending below the bottom wall 34 and an upper portion 43 extending into the respective extension 39. Each of the pipes 40 can act as a siphon to convey freshly brewed coffee from the insert 32 into the lower portion of the filter holder 18. The pipes 40 are preferably integral parts of the bottom wall 34.

The upper portion 43 of each pipe 40 is spacedly surrounded by an inverted cup-shaped hood 44 (see FIG. 4) which rests on suitably distributed bases or legs 46 (FIGS. 3 and 5) forming part of or bonded to the bottom wall 34 and surrounding the respective upper portion 43. The arrangement is such that the hoods 44 and the respective upper portions 43 define clearances 45 which permit freshly brewed hot coffee to overflow from the recess 37 of the insert 32 into the lower portion of the filter holder 18. The bases or legs 46 are located at a level such that the hood 44 which is supported by the legs cannot sealingly engage the upper end face of the respective upper portion 43, i.e., the hood 44 cannot seal the recess 37 from the lower portion of the filter chamber in the holder 18.

Figure 2:
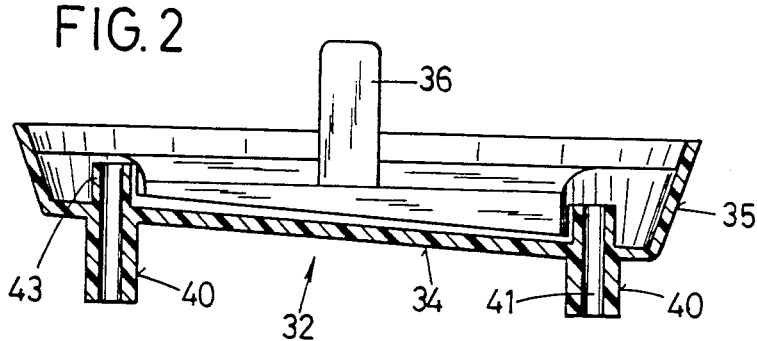
FIG. 2 is an enlarged central vertical sectional view of a novel insert which is installed in the filter holder when the machine is to brew a smaller quantity of coffee, tea, chocolate or another hot beverage.
Figure 4:
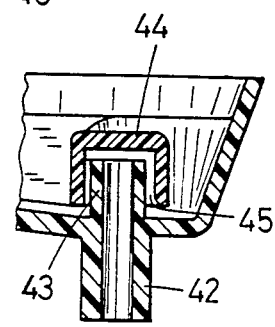
FIG. 4 is an enlarged view of a detail in the insert of FIG. 2.

The upper end of the upper portion 43 of the left-hand pipe 40 of FIG. 2 is located at a level above the upper end of the upper portion 43 of the right-hand pipe 40 when the insert 32 is properly installed in the holder 18. This is due to inclination of the bottom wall 34 with reference to a horizontal plane; however, the same result can be achieved by making one of the upper portions 43 longer than the other. In view of such difference between the levels of the upper ends of upper portions 43, one of the siphons becomes effective ahead of the other siphon, i.e., freshly brewed coffee begins to overflow from the recess 37 through the hole 41 of the right-hand pipe 40 of FIG. 2 or 3 before the left-hand pipe 40 begins to convey a stream of hot coffee.

When the valving element 50 in the manifold 15 assumes the phantom-line position of FIG. 6, hot water is free to flow from the conduit 14 into the intake 16 and thence into the opening 17 to flow onto the porous bag or bags on the supporting ribs 38 and to gather in the recess 37 and its extensions 39. The recess 37 actually gathers a supply of freshly brewed coffee because the liquid which accumulates therein has already contacted comminuted coffee beans in the bag or bags on the supporting ribs 38.

As the supply of freshly brewed coffee rises in the main portion of the recess 37, it also rises in the annular clearances 45 between the upper portions 43 of the pipes 40 and the respective hoods 44. When the upper level of freshly brewed coffee in the insert 32 reaches the upper end of the right-hand upper portion 43 of FIG. 2, it overflows into the respective hole 41 and the respective pipe 40 then acts as a siphon, i.e., it conveys a stream of hot coffee into the lower portion of the holder 18. The left-hand pipe 40 of FIG. 2 becomes effective (i.e., it begins to act as a siphon) when the level of freshly brewed coffee in the insert 32 rises to the level of the upper end of its upper portion 43.

The stream or streams of coffee which flow from the insert 32 via pipe or pipes 40 gather in the lower portion of the holder 18 on a normally closed gate including a lever 19 the right-hand end of which is pivotable about a substantially horizontal axis defined by a pivot member 19 on the holder 18 so that the lever 19 can be moved to open (raised) or closed (lowered) position. The central portion of the lever 19 carries a valving element 219 which is biased by a spring 23 so that it normally seals an aperture or opening 20 in the bottom wall 21 of the filter holder 18. If the lever 19 is pivoted from the operative position of FIG. 1 in which the gate prevents freshly brewed coffee from leaving the chamber of the filter holder 18 by way of the opening 20 and into the cup 29, the spring 23 yields and enables the valving element 219 on the lever 19 to expose the opening 20 in the bottom wall 21.

The lever 19 of the gate can be pivoted in a number of ways. As shown in FIG. 1, the lever 19 includes a relatively wide portion 24 with a stop 25 which is flanked by two walls extending at right angles to each other. The stop 25 is located behind a suitably configurated cam face 27 of the lever 19. The distance between the cam face 27 and stop 25 on the one hand, and the warming plate 30 on the base 11 of the housing of the brewing machine 10 on the other hand, is selected in such a way that when a specially dimensioned coffee pot (e.g., a vessel made of glass or another light-transmitting material) or a thermos bottle is placed onto and slid along the warming plate 30, the upper part of such pot engages the came face 27 and pivots the lever 19 of the gate upwardly about the substantially horizontal axis against the opposition of the spring 23 so that the valving element 219 on the lever 19 exposes the opening 20 in the bottom wall 21 of the filter holder 18. The stop 25 can serve to arrest the pot in an optimum position with reference to the warming plate 30 and filter holder 18. The valve 219 on the lever 19 of the gate opens only when the open upper end of the pot is already located beneath the opening 20 so that hot coffee issuing from the chamber of the filter holder 18 cannot spill onto the warming plate 30 and/or onto the base 11. The just discussed pot is used when the machine 10 is to make a larger quantity (e.g., ten cups) of hot coffee. At such time, the insert 32 is removed from the filter holder 18 and the latter receives a hollow conical filter paper confining a requisite quantity of comminuted coffee beans.

If the machine 10 is used with the insert 32 installed in the upper portion of the filter holder 18 as shown in FIG. 1, and the operator of the machine wishes to fill a single cup 29, the upper portion of such cup is located well below the gate when the cup rests on the warming plate 30. The operator then simply lifts the cup 29 so that the rim of the cup engages the stop 25 adjacent the cam face 27. As the operator pushes the cup 29 upwardly, the lever 19 of the gate pivots at 119 about its substantially horizontal axis against the resistance of the spring 23, and the valving element 219 on the lever 19 exposes the opening 20 so that freshly brewed coffee flows into the cup 29 as long as the latter maintains the gate in open position. As mentioned above, the stop 25 is bounded by two walls which are disposed at right angles to each other; this is desirable and advantageous because it enables the operator to maintain the lifted cup 29 in an optimum position for pivoting of the lever 19 of the gate at a time when the open upper end of the cup is located below the opening 20 in the bottom wall 21 of the filter holder 18. The operator lowers the cup 29 when the latter is filled with freshly brewed coffee to a desired level, and this enables the spring 23 to return the valving element 219 on the lever 19 of the gate to sealing position. The cup 29 is being filled by a continuously flowing stream of freshly brewed coffee as long as spring 23 is compelled to store energy, i.e., as long as the opening 20 remains exposed. The partly or completely filled cup 29 can be deposited on the warming plate 30 or can be transferred onto a saucer or held by its handle.

The lever 19 has a projection or arm 26 which extends through and beyond a vertically extending slot 28 in a cylindrical skirt 118 surrounding the bottom wall 21 and the adjacent frustoconical portion of the holder 18.

The arm 26 can be engaged and pushed or pulled upwardly by a finger or by an implement held by on hand of the operator to pivot the lever 19 in a direction to expose the opening 20 and to thus permit a stream of freshly brewed coffee to leave the lower portion of the chamber in the filter holder 18. If the lever 19 is moved to the open position by way of its arm 26, the cup 29 can rest on the warming plate 30 while the chamber of the filter holder 18 is relieved of a portion of freshly brewed coffee. The length or right of the slot 28 in the skirt 118 of the filter holder 18 determines the extent to which the lever 19 can be pivoted to open position irrespective of whether the lever is pivoted by a pot which slides along the cam face 27, by the rim of a cup 29 which bears against the lever in the region of the stop 25, or by way of the arm 26. As shown in FIG. 1, the spring 23 normally maintains the arm 26 in engagement with the surface bounding the lowermost portion of the slot 28 to thus ensure that the opening 20 is sealed.

FIG. 6 shows schematically the manifold 15 which is installed in the housing of the machine 10 between the upper part of the conduit 14, the intake 16 of the filter holder 18 and the water container 12. The arrow A indicates the direction of flow of insufficiently heated water from the conduit 14, through the manifold 15 and back into the container 12. The arrow B indicates the direction of flow of adequately heated water from the conduit 14, through the manifold 15 and into the intake 16. As explained above, the direction of flow of water is selected automatically by the deformable disc-shaped valving element 50 which is installed in the manifold 15 in a manner as shown in FIG. 7 of U.S. Pat. No. 4,790,240. The central or median portion of the valving element 50 is clamped between the adjacent portions of the manifold 15, and the marginal portion of the thus clamped valving element 50 is free to snap over from the phantom-line position to the solid-line position of FIG. 6 when the conduit 14 delivers a stream of relatively cold or insufficiently heated water and to snap to the phantom-line position of FIG. 6 when the temperature of water which is supplied by the conduit 14 is sufficiently high to warrant admission of water into the intake 16 of the filter holder 18.

As explained above, the insert 32 will be used if the operator of the machine 10 wishes to brew a relatively small quantity of hot coffee. The insert 32 is removed from the holder 18, and the chamber of this holder receives a hollow conical filter paper with a larger quantity of comminuted coffee beans, if the operator wishes to brew a larger quantity (e.g., a total of ten cups) of hot coffee. The warming plate 30 then supports a larger vessel, e.g., the aforediscussed pot, which can serve to automatically pivot the lever 19 so as to expose the opening 20 in the bottom wall 21 of the holder 18 during sliding relative to the warming plate 30 toward its optimum position with reference to the opening 20.

Valving elements 50 which change their shape in response to heating or cooling are well known in the art and are available on the market. In fact, such valving elements are furnished in a number of sizes and shapes and according to their ability to change shape in response to heating to one of a number of different temperatures. Thus, it is possible to select for use in the manifold 15 a valving element 50 which responds to a selected temperature of hot water flowing from the conduit 14 into and beyond the inlet of the manifold 15.

Figure 3:
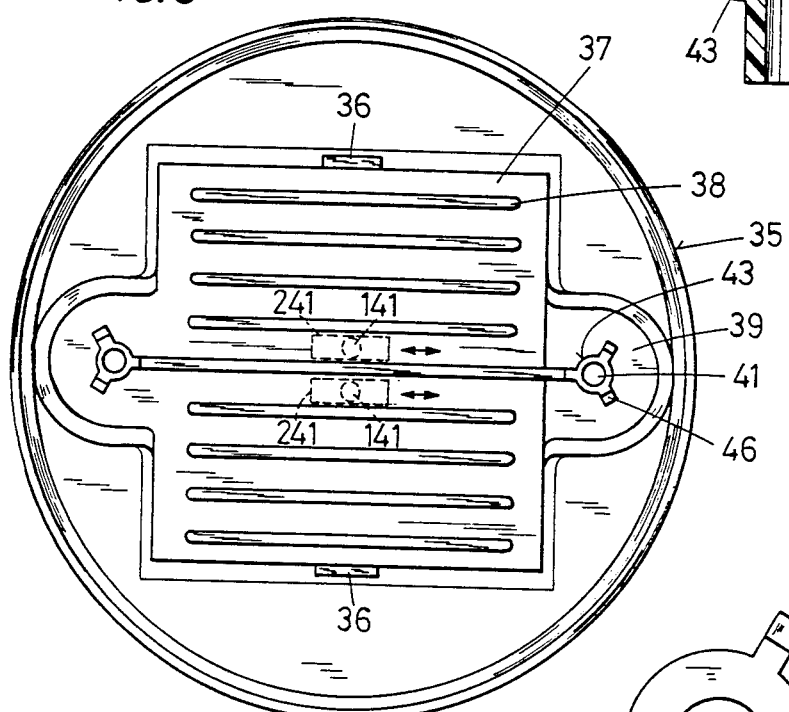
FIG. 3 is a plan view of the insert which is shown in FIG. 2.
Figure 5:
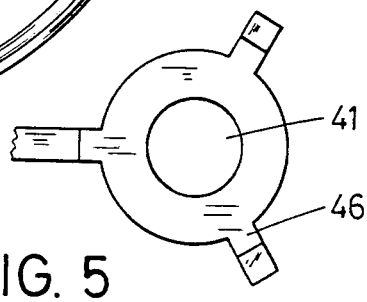
FIG. 5 is an enlarged view of a detail in the insert of FIG. 3.

The improved brewing machine is susceptible of many further modifications. For example, the configuration of the insert 32 can depart from that which is shown in FIGS. 1 to 3, depending on the shape of the surface bounding the chamber of the filter holder 18. Moreover, it is not necessary that the rim 35 of the insert 32 fit snugly into the upper portion of the chamber which is defined by the filter holder 18. For example, the upper portion of the rim 35 can be provided with hook-shaped projections serving to engage the top wall of that part of the holder which is provided with the surface 33 so that the insert can be suspended in the interior of the chamber by hanging from the topmost portion of the wall around the chamber. The just described modification can be employed with advantage if the top wall of the filter holder 18 is readily accessible in the machine 10 or in an analogous machine.

It is further possible to increase or reduce the number of siphons in the insert 32. Thus, one of the pipes 40 can be omitted or the bottom wall 34 of the insert 32 can be provided with three or more suitably distributed siphons each of which can (but need not) become effective when the supply of freshly brewed coffee, tea or another hot beverage in the recess 37 reaches a particular level. It is possible to select the dimensions and/or the locations of the siphons in such a way that two or more siphons will begin to become effective at the same time, or to use two or more siphons each of which begins to convey a stream of freshly brewed hot beverage at a different time. Still further, it is not necessary that the diameters of holes 41 in all of the siphons be the same. For example, one of the two illustrated holes 41 can have a cross-sectional area which greatly exceeds that of the other hole 41, i.e., one of the siphons can convey hot beverages at a rate greater than the other siphon or siphons. Moreover, it is possible to provide at least one of the pipes 40 with an adjustable flow restrictor which enables the operator to select the rate of flow of hot beverages through the respective hole 41.

As already mentioned above, the shape of the recess 37 preferably conforms to the shape of the bag which is to be used in the insert 32 in connection with the brewing of a limited quantity of a hot beverage. If the outline of the insert 32 is round (so that it can fit into an annular portion of the filter holder 18), the outline of the recess 37 can resemble or depart from the outline of the insert. The same holds true if the insert has a polygonal or oval or other suitable outline. It is presently preferred to select for the recess 37 a shape which conforms to that of available bags containing supplies of comminuted coffee beans, comminuted tea leaves or other substances which impart flavor and/or color to the beverage entering the filter holder 17 via opening 17 and leaving the insert via one or more siphons. The recess 37 can be dimensioned to accept two coplanar bags side-by-side. The distribution and/or number and/or dimensions of the supporting ribs 38 or any other suitable supporting means can be selected practically at will, as long as the supporting means provide paths for the flow of streamlets of freshly brewed hot beverage from the main portion of the recess 37 toward and into its extension or extensions 39. For example, the illustrated elongated supporting means 38 in the form of ribs can be replaced by or used jointly with stud-shaped, ring-shaped and/or otherwise configured protuberances which can maintain one or more bags at a level above the bottom surface of the wall 34 beneath the main or central portion of the recess 37.

It is further possible to design the insert in such a way that it can accept a substantially conical filter paper containing a requisite supply of coffee, tea or other substance which is to influence the color and/or aroma and/or taste of the freshly brewed beverage.

The pipes 40 or analogous siphons can be replaced with simple holes 141 in the bottom wall 34 of the improved insert. Alternatively, one or more holes 141 can be used jointly with one or more siphons. For example, a portion of the bottom wall 34 can resemble or constitute a sieve which allows freshly brewed beverage to descend in the filter holder 18 on its way toward the bottom wall 21. All of the holes 141 in the bottom wall 34 of the insert may but need not have the same size and/or shape. The distribution of holes 141 in the bottom wall 34 may be regular or irregular or in part regular and in part irregular. The aforementioned flow restrictor means can be used in a perforated bottom wall 34 to vary the effective cross-sectional area of one or more holes 141 therein (note the reciprocable regulating means 241 in FIG. 3). Such regulating or flow restrictor means (241) can include slidable plates or panels, pivotable flaps, apertured plugs receivable in the holes of the bottom wall 34 and/or others. Adjustable flow restrictors (each of which can be designed to completely or partially block the flow of a beverage through the respective hole 141 or siphon 40) can be manipulated by the operator prior to introduction of the insert into the filter holder so as to regulate the rate of flow of beverage from the insert into the filter holder. The adjustment can be coarse, or the insert can be equipped with flow restrictor means which enable the operator to select the rate of fluid flow with a high degree of accuracy. Suitable indicia can be provided next to each flow restrictor, or on each flow restrictor, to facilitate the task of the operator in selecting the desired rate of flow of a freshly brewed beverage into the chamber of the filter holder.

An important advantage of the improved machine is its versatility combined with simplicity. Thus, the operator of the machine can economize with coffee, tea or any other flavoring agent if the machine is to furnish only a small quantity of a freshly brewed hot beverage. Moreover, the consumption of electrical energy can be reduced considerably and it is not necessary to purchase two or more machines having different capacities. Furthermore, the machine is preferably designed in such a way that its insert can accept commercially available bags containing small quantities of comminuted coffee beans or other flavoring substances. It is not necessary to alter the size and/or shape of the filter holder 18 in order to accommodate an insert 32 therein. The machine can be furnished with two or more inserts each of which can accept a different quantity of a flavoring agent or each of which can accept a differently dimensioned flat bag, conical filter paper or an otherwise configured receptacle for comminuted coffee beans, comminuted tea leaves or another substance which can be used to brew a hot beverage.

The rate of flow of freshly brewed beverage in the insert can be selected in such a way that the liquid in the recess 37 is in shorter- or longer-lasting contact with the contents of the bag or bags or filter paper on the supporting means 38 of the bottom wall 34. Thus, even though hot water which is admitted into the filter holder 18 by way of the opening 17 immediately descends onto the bag or bags which are carried by the selected insert, the rate at which the freshly brewed beverage descends into the chamber above the bottom wall 21 of the filter holder 18 can be selected within a desired range to take full advantage of the flavor and/or other desirable characteristics of the entire supply of coffee or the like in the selected insert.

The gate including the lever 19 is preferably closed when the freshly brewed liquid flows from the recess 37 into the lower portion of the chamber in the filter holder 18. This reduces the likelihood of splashing while the beverage flows into a cup 29 or another suitable vessel beneath the gate. Closing of the gate during accumulation of a quantity of freshly brewed beverage above the bottom wall 21 is especially desirable if the vessel (such as the illustrated cup 29) is relatively small and rests on the warming plate 30. Were the gate open, liquid would descend from one or both pipes 40 and all the way into the relatively small cup 29 on the warming plate 30; this could cause extensive splashing, especially when the cup already contains a substantial quantity of a freshly admitted beverage. The two-stage descent of beverage, first from the recess 37 onto the bottom wall 21 while the gate is closed and thereupon from the lower portion of the chamber in the filter holder 18 while the gate is open (in response to pivoting of the lever 19 at 25, 26 or 27) greatly reduces the likelihood of splashing. The spring 23 ensures that the valving element 219 reassumes its sealing position as soon as the stressing of the spring 23 is interrupted, terminated or reduced to an extent which is necessary to return the arm 26 into the lowermost portion of the slot 28.

Commercially available bags which can be used in the insert of the improved machine can be provided with small or large pores, and they can be adequately sealed to prevent escape of flavor during storage. Each such bag contains an accurately metered quantity of comminuted coffee beans or another flavoring agent. The same holds true if the insert is designed to accept one or more receptacles in the form of conical funnels or the like each of which contains or can receive a desired quantity of a flavoring agent which suffices for the brewing of a relatively small quantity of a hot beverage, i.e., a quantity which is normally less than the maximum quantity of liquid receivable in the container 12.

The insert 32 with two pipes or siphons 40 constitutes one presently preferred embodiment of the insert. The pipes are preferably spaced apart from one another to convey liquid from spaced apart portions of the recess 37. The illustrated bottom wall 34 establishes only two paths (holes 41) for the flow of beverage from the recess 37 into the chamber of the filter holder 18. The hoods 44 can be provided with inwardly extending projections which are maintained in frictional engagement with the external surfaces of the respective upper portions 43 so that the hoods are even more likely to assume and reman in optimum positions in which they cooperate with the respective pipes 40 to define clearances 45 of the requisite cross-sectional area for the flow of a beverage into the chamber of the filter holder 18.

The combined area of surface-to-surface contact between the supporting means 38 and one or more bags thereon is preferably small so as to enable the hot liquid which is admitted via opening 17 to penetrate through the bag or bags on the supporting means and to enter the channels between such supporting means on its way toward the extensions 39 and/or into the hole or holes in the bottom wall 34.

It is clear that a relatively large vessel (such as the aforediscussed coffee pot or thermos bottle which can automatically open the gate including the lever 19 in response to movement along the warming plate 30) can be used to accept a relatively small quantity of a hot beverage which is obtained by causing a small quantity of hot water or another liquid to contact one or more bags in the insert 32. This is not always desirable because a relatively small quantity of freshly brewed beverage (e.g., coffee) in a large vessel is likely to be cooled rapidly by exchanging heat with the material of the vessel, especially if the warming plate is turned off. Therefore, the relatively small quantity of a freshly brewed beverage is preferably admitted into a relatively small vessel, such as the illustrated cup 29, and the gate is designed in such a way that it can be opened by the rim of the cup 29 (which can engage the cam face 27 and/or the stop 25) or by hand (through the medium of the arm 26). Thus, the operator of the machine is in a position to store the freshly brewed beverage in the chamber of the filter holder 18 until the chamber accumulates the required quantity of freshly brewed beverage, and the accumulated beverage is thereupon permitted to rapidly descend into the cup 29 while the cup rests on the warming plate 31 or while the rim of the cup is used to maintain the gate in open position. In other words, the cup 29 can be used as a means for opening the gate with the same degree of efficiency as a specially designed vessel which automatically engages the cam face 27 of the lever 19 while sliding along the warming plate 30.

The arm 26 will be used as a means for opening the gate when the operator wishes to leave the cup 29 on the warming plate 30.

It goes without saying that the filter holder 18 is detachable from the housing of the machine 10 and/or that the top portion of the housing above the filter holder 18 is detachable from the remaining portion of the housing so as to enable the person in charge to introduce the insert 32 (or another insert) into, or to remove the insert from, the chamber of the filter holder 18. Such mounting of the filter holder and such construction of the housing for the filter holder are well known in the art of coffee making and like machines. An empty insert 32 can be stored in the filter holder 18 when the machine 10 is not in use.

The quantity of comminuted coffee beans or another flavoring agent in the insert of the present invention can be selected with a view to brew one or two cups of coffee, tea or another hot beverage.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A machine for brewing hot beverages, comprising a housing; a container for a supply of liquid in said housing; a liquid heater in said housing; a hollow filter holder carried by said housing and having an opening, said holder being arranged to receive a relatively large quantity of a flavoring agent for heated liquid; a gate carried by one of the parts including said holder and said housing and being movable between open and closed positions in which said opening is respectively exposed and sealed; an insert removably receivable in said holder and arranged to receive a relatively small quantity of flavoring agent; and means for conveying heated liquid from said heater to said holder so that the liquid contacts the large quantity of flavoring agent when the insert is removed and the small quantity of flavoring agent when the insert is installed in said holder.

2. The machine of claim 1, wherein said opening is provided at a level below the large or small quantity of flavoring agent in said holder so that the heated liquid which has contacted the flavoring agent in said holder descends by gravity toward and gathers above said opening in closed position of said gate.

3. The machine of claim 2, further comprising a support for vessels beneath said opening so that a vessel resting on said support can receive liquid from said holder in the open position of said gate.

4. The machine of claim 1, wherein said insert has a bottom wall provided with a recess for reception of the relatively small quantity of flavoring agent, said bottom wall further having at least one outlet for the flow of liquid from said recess into the interior of said filter holder.

5. The machine of claim 4, wherein said insert comprises at least one siphon which defines said outlet.

6. The machine of claim 4, wherein said recess has spaced-apart first and second extensions and said bottom wall comprises first and second outlets which respectively communicate with said first and second extensions.

7. The machine of claim 6, wherein said recess has a main portion between said extensions.

8. The machine of claim 4, wherein said at least one outlet includes a pipe having a portion extending from said bottom wall upwardly and into said recess and having a hole for the passage of liquid from said recess into the interior of the holder above said opening.

9. The machine of claim 8, wherein said recess has an extension and said pipe is provided in said extension, said outlet further comprising a hood overlying and spaced apart from said portion of said pipe to define therewith a clearance for the flow of liquid from said extension into the interior of said holder above said opening when the supply of liquid in said recess rises so that said portion of said pipe is immersed in such liquid.

10. The machine of claim 9, wherein said pipe further includes a second portion which extends downwardly beyond said bottom wall.

11. The machine of claim 8, wherein said outlet further comprises a hood which overlies said portion of said pipe and defines therewith a clearance for the flow of liquid from said insert into the interior of said holder above said opening when the supply of liquid in the recess rises so that said portion of the pipe is immersed in the liquid, said bottom wall having at least one base which serves as a rest for said hood.

12. The machine of claim 4, wherein said bottom wall is inclined with reference to a horizontal plane when the insert is installed in said holder.

13. The machine of claim 4, wherein said bottom wall has a plurality of outlets each including a pipe having a portion extending above said bottom wall, said portions of said pipes having open upper ends disposed at different levels.

14. The machine of claim 4, wherein said bottom wall further comprises means for supporting a relatively small supply of flavoring agent in said recess 15. The machine of claim 14, wherein said supporting means comprises ribs.

16. The machine of claim 4, wherein said gate comprises at least one stop which is engageable by a vessel so that the vessel can move the gate to open position and thereupon receives liquid from the holder by wa of said opening.

17. The machine of claim 16, wherein said at least one stop is engageable by the rim of a cup.

18. The machine of claim 16, wherein said gate comprises a lever which is movable between said open and closed positions and is provided with said stop, said lever further having a cam face adjacent said stop and being engageable by a vessel which is in motion toward engagement with said stop.

19. The machine of claim 18, wherein said lever includes an enlarged portion and said enlarged portion includes said stop and said cam face.

20. The machine of claim 4, wherein said holders includes a wall having a slots and said gate includes a lever which is pivotable on said holder between said open and closed positions and includes a portion extending through said slot.

21. The machine of claim 20, wherein said portion of said lever includes an arm which is engageable by hand to facilitate pivoting of the lever between said open and closed positions.

22. The machine of claim 4, wherein said holder has an internal surface which surrounds the installed insert, said insert having a rim extending upwardly from said bottom wall and having an external surface complementary to the internal surface of said holder.

23. The machine of claim 22, wherein said surfaces are conical surfaces.

24. The machine of claim 4, wherein said insert has at least one handle which facilitates its installation in and its removal from said holder.

25. The machine of claim 4, wherein said at least one outlet includes a hole in said bottom wall.

26. The machine of claim 4, further comprising means for regulating the rate of liquid flow through said at least on outlet.

27. The machine of claim 1, wherein said insert has at least one recess arranged to receive at least one receptacle for a relatively small supply of a flavoring agent.

28. The machine of claim 1, wherein said insert is arranged to receive a relatively small supply of flavoring agent which suffices for the brewing of one or two cupfuls of a hot beverage, such as coffee or tea.

\* \* \* \* \*